(12) United States Patent
Taherzadeh Boroujeni et al.

(10) Patent No.: US 11,844,115 B2
(45) Date of Patent: Dec. 12, 2023

(54) INDICATING USER EQUIPMENT CAPABILITY USING RANDOM ACCESS PREAMBLES

(71) Applicant: QUALCOMM Incorporated, San Diego, CA (US)

(72) Inventors: Mahmoud Taherzadeh Boroujeni, San Diego, CA (US); Hung Dinh Ly, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 88 days.

(21) Appl. No.: 17/453,722

(22) Filed: Nov. 5, 2021

(65) Prior Publication Data

US 2022/0150984 A1     May 12, 2022

Related U.S. Application Data

(60) Provisional application No. 63/111,264, filed on Nov. 9, 2020.

(51) Int. Cl.
    *H04W 74/08*      (2009.01)
    *H04W 74/00*      (2009.01)

(52) U.S. Cl.
    CPC ..... *H04W 74/0841* (2013.01); *H04W 74/006* (2013.01); *H04W 74/0866* (2013.01)

(58) Field of Classification Search
    CPC ....... H04L 1/0026; H04L 1/08; H04L 1/1864; H04L 1/1893; H04L 1/1896; H04W 74/006; H04W 74/0833; H04W 74/0841; H04W 74/0866; H04W 8/24
See application file for complete search history.

(56) References Cited

U.S. PATENT DOCUMENTS

| | | | |
|---|---|---|---|
| 10,506,605 B2 | 12/2019 | Lee et al. | |
| 2017/0141833 A1* | 5/2017 | Kim | ............... H04L 5/0057 |
| 2020/0029370 A1 | 1/2020 | Hu et al. | |
| 2020/0359421 A1 | 11/2020 | Yi et al. | |
| 2021/0251016 A1* | 8/2021 | Xiong | ............... H04W 74/008 |
| 2021/0392699 A1* | 12/2021 | Park | ............... H04W 74/0891 |
| 2022/0322256 A1* | 10/2022 | Cheng | ............... H04B 17/318 |
| 2022/0400511 A1* | 12/2022 | Li | ............... H04W 24/08 |

OTHER PUBLICATIONS

3GPP, "RAN1 Chairman's Notes," 3GPP TSG RAN WG1 Meeting #104-e, e-Meeting, Jan. 25-Feb. 5, 2021, 148 pages.

(Continued)

*Primary Examiner* — Kashif Siddiqui

(74) *Attorney, Agent, or Firm* — Harrity & Harrity, LLP

(57) ABSTRACT

Various aspects of the present disclosure generally relate to wireless communication. In some aspects, a user equipment (UE) may transmit, to a base station, a physical random access channel (PRACH) preamble. At least one property associated with the PRACH preamble corresponds to a request for repetition of Msg3. Accordingly, the UE may transmit, to the base station and based at least in part on the random access preamble, two or more repetitions of a Msg3. Numerous other aspects are provided.

30 Claims, 10 Drawing Sheets

(56) References Cited

OTHER PUBLICATIONS

China Telecom: "Discussion on Msg3 PUSCH Enhancements", 3GPP TSG RAN WG1 #103-e, 3GPP Draft, R1-2007996, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, pp. 1-2, Oct. 16, 2020 (Oct. 16, 2020), XP051939426, Retrieved from the Internet: URL: https://ftp.3gpp.org/tsg_ran/WG1_RL1/SGR1_103-e/Docs/R1-2007996.zip R1-2007996.doc [retrieved on Oct. 16, 2020] Section 2, p. 1-p. 2.

International Search Report and Written Opinion—PCT/US2021/072280—ISA/EPO—dated Feb. 23, 2022.

Moderator (ZTE Corporation) : "Feature Lead Summary on Coverage Enhancement for Channels Other Than PUSCH and PUCCH", 3GPP Draft, R1-2009322, 3GPP TSG RAN WG1 #103-e, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 26, 2020 (Oct. 26, 2020), XP051947560, pp. 1-14, Retrieved from the Internet: URL: https://ftp.3gpp.org/tsg_ran/WG1_RL1/TSGR1_103-e/Docs/R1-2009322.zip R1-2009322 Feature lead summary on coverage enhancement for channels other than PUSCH and PUCCH.docx [retrieved on Oct. 26, 2020] Aspect 2 and Aspect 5.

NEC: "Discussion on Msg3 Coverage Enhancement", 3GPP Draft, R1-2008080, 3GPP TSG RAN WG1 #103-e, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 16, 2020 (Oct. 16, 2020), XP051939457, 2 Pages, Retrieved from the Internet: URL: htttps://ftp.3gpp.org/tsg_ran/WG1_RL1/TSGR1_103-e/Docs/R1-2008080.zip R1-2008080 Discussion on Msg3 coverage enhancement.docx [retrieved on Oct. 16, 2020] Sections 2.1. and 2.2, p. 1-p. 2.

\* cited by examiner

INDICATING USER EQUIPMENT CAPABILITY USING RANDOM ACCESS PREAMBLES

CROSS-REFERENCE TO RELATED APPLICATION

This Patent Application claims priority to U.S. Provisional Patent Application No. 63/111,264, filed on Nov. 9, 2020, entitled "INDICATING USER EQUIPMENT CAPABILITY USING RANDOM ACCESS PREAMBLES," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for indicating user equipment capability using random access preambles.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting, to a base station, a physical random access channel (PRACH) preamble, wherein at least one property associated with the PRACH preamble corresponds to a request for Msg3 repetition. The method may further include transmitting, to the base station and based at least in part on the random access preamble, two or more repetitions of a Msg3.

Some aspects described herein relate to a method of wireless communication performed by a base station. The method may include receiving, from a UE, a PRACH preamble, wherein at least one property associated with the PRACH preamble corresponds to a request for Msg3 repetition. The method may further include receiving, from the UE and based at least in part on the random access preamble, two or more repetitions of a Msg3.

Some aspects described herein relate to an apparatus for wireless communication at a UE. The apparatus may include a memory and one or more processors coupled to the memory. The one or more processors may be configured to transmit, to a base station, a PRACH preamble, wherein at least one property associated with the PRACH preamble corresponds to a request for Msg3 repetition. The one or more processors may be further configured to transmit, to the base station and based at least in part on the random access preamble, two or more repetitions of a Msg3.

Some aspects described herein relate to an apparatus for wireless communication at a UE. The apparatus may include a memory and one or more processors coupled to the memory. The one or more processors may be configured to receive, from a UE, a PRACH preamble, wherein at least one property associated with the PRACH preamble corresponds to a request for Msg3 repetition. The one or more processors may be further configured to receive, from the UE and based at least in part on the random access preamble, two or more repetitions of a Msg3.

Some aspects described herein relate to a non-transitory computer-readable medium that stores a set of instructions for wireless communication by a UE. The set of instructions, when executed by one or more processors of the UE, may cause the UE to transmit, to a base station, a PRACH preamble, wherein at least one property associated with the PRACH preamble corresponds to a request for Msg3 repetition. The set of instructions, when executed by one or more processors of the UE, may further cause the UE to transmit, to the base station and based at least in part on the random access preamble, two or more repetitions of a Msg3.

Some aspects described herein relate to a non-transitory computer-readable medium that stores a set of instructions for wireless communication by a base station. The set of instructions, when executed by one or more processors of the base station, may cause the base station to receive, from a UE, a PRACH preamble, wherein at least one property associated with the PRACH preamble corresponds to a request for Msg3 repetition. The set of instructions, when executed by one or more processors of the base station, may further cause the base station to receive, from the UE and based at least in part on the random access preamble, two or more repetitions of a Msg3.

Some aspects described herein relate to an apparatus for wireless communication. The apparatus may include means for transmitting, to a base station, a PRACH preamble, wherein at least one property associated with the PRACH preamble corresponds to a request for Msg3 repetition. The apparatus may further include means for transmitting, to the base station and based at least in part on the random access preamble, two or more repetitions of a Msg3.

Some aspects described herein relate to an apparatus for wireless communication. The apparatus may include means for receiving, from a UE, a PRACH preamble, wherein at least one property associated with the PRACH preamble corresponds to a request for Msg3 repetition. The apparatus may further include means for receiving, from the UE and based at least in part on the random access preamble, two or more repetitions of a Msg3.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
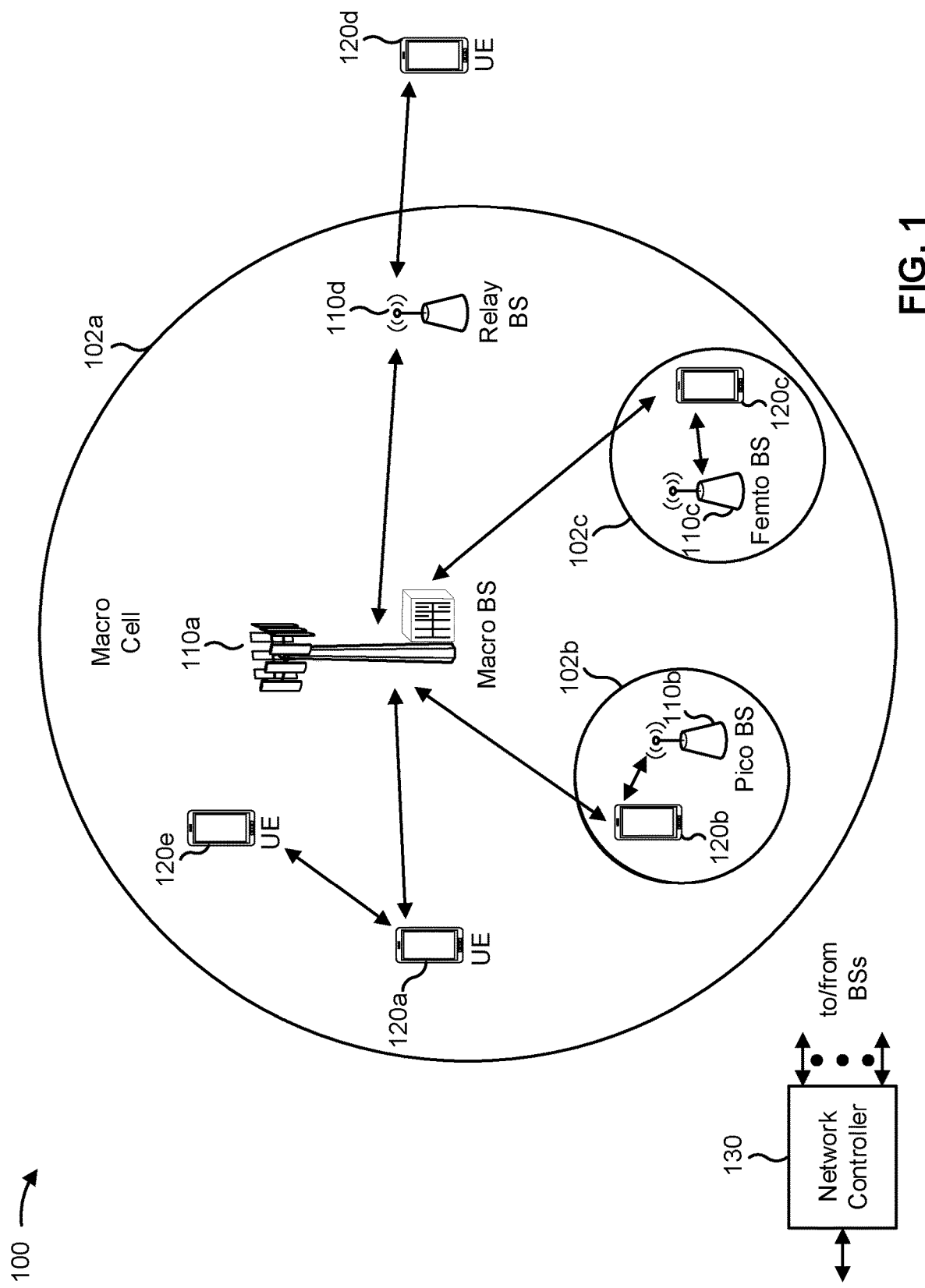
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-*a* or FR4-1, and/or FR5, or may be within the EHF band. It is contemplated that the frequencies included in these operating bands (e.g., FR1, FR2, FR3, FR4, FR4-*a*, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
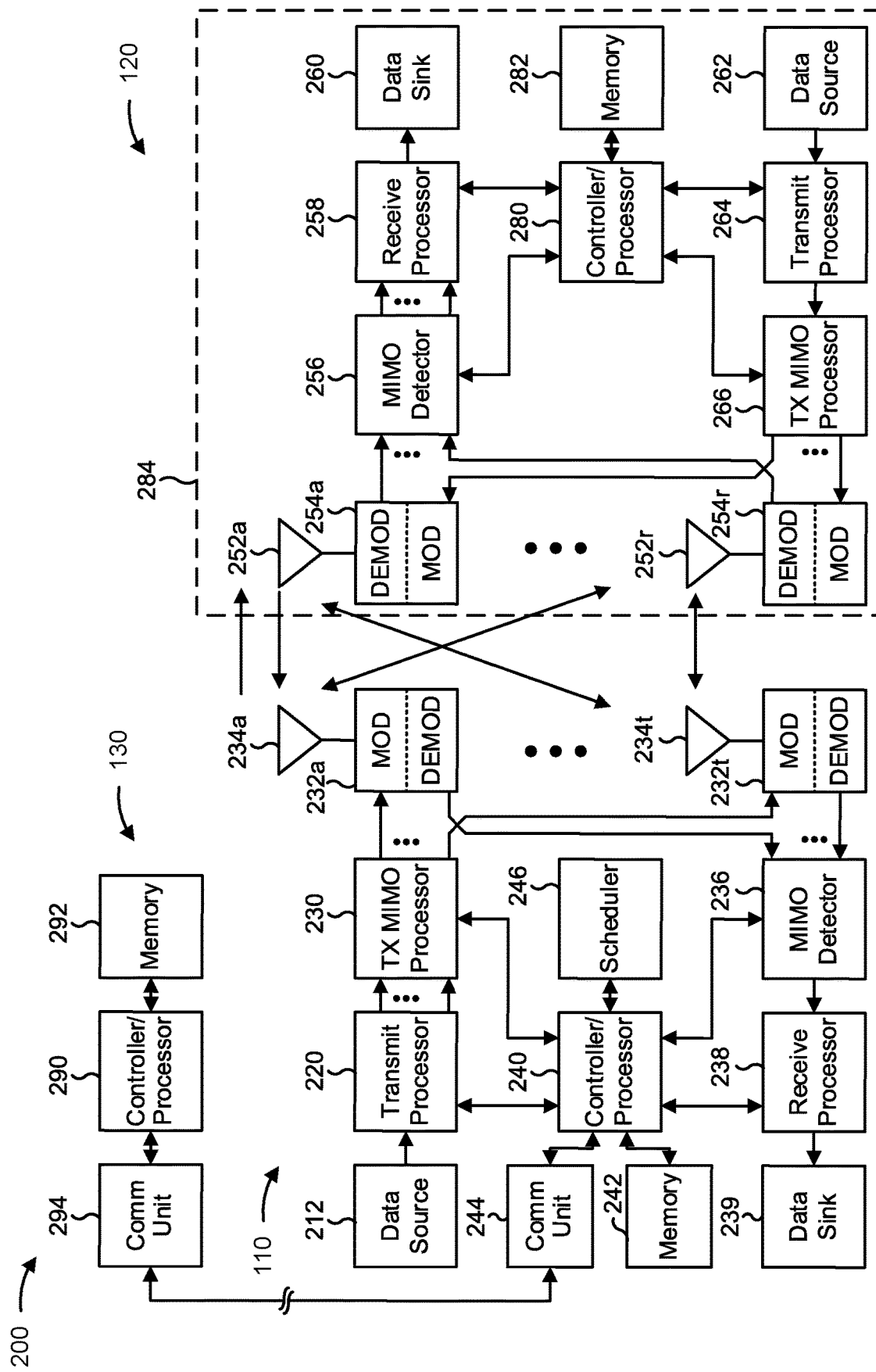
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the base station 110, the controller/processor 280 of the UE 120, and/or any other component(s) of FIG. 2 may perform one or more techniques associated with indicating UE capability using random access preambles, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a UE (e.g., UE 120 and/or apparatus 800 of FIG. 8) may include means for transmitting, to a base station (e.g., base station 110 and/or apparatus 900 of FIG. 9), a physical random access channel (PRACH) preamble, wherein at least one property associated with the PRACH preamble corresponds to a request for Msg3 repetition; and/or means for transmitting, to the base station and based at least in part on the random access preamble, two or more repetitions of a Msg3. The means for the UE to perform operations described herein may include, for example, one or more of antenna 252, modem 254, MIMO detector 256, receive processor 258, transmit processor 264, TX MIMO processor 266, controller/processor 280, or memory 282.

In some aspects, a base station (e.g., base station 110 and/or apparatus 900 of FIG. 9) may include means for receiving, from a UE (e.g., UE 120 and/or apparatus 800 of FIG. 8), a PRACH preamble, wherein at least one property associated with the PRACH preamble corresponds to a request for Msg3 repetition; and/or means for receiving, from the UE and based at least in part on the random access preamble, two or more repetitions of a Msg3. The means for the base station to perform operations described herein may include, for example, one or more of transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
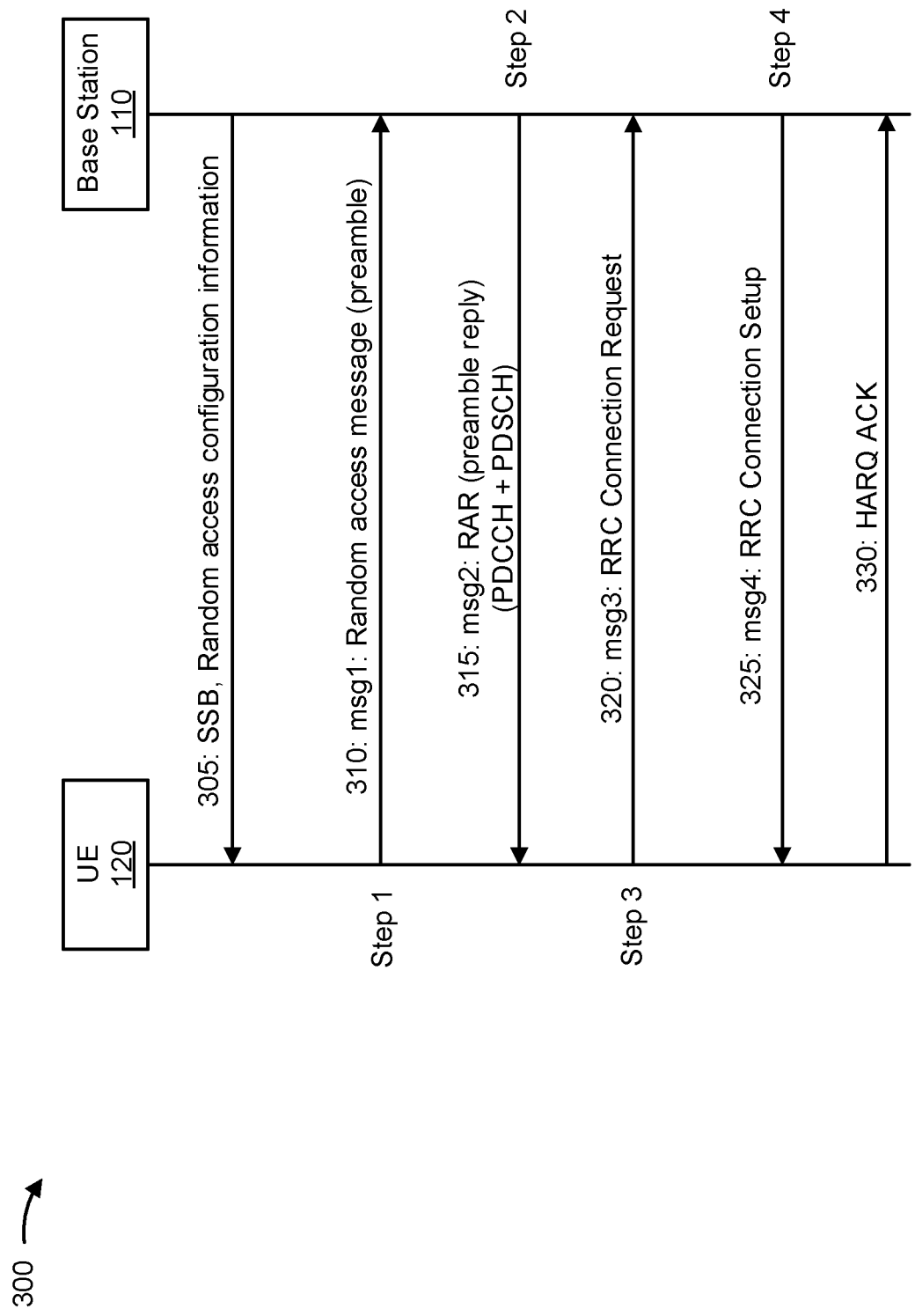
FIG. 3 is a diagram illustrating an example of a four-step random access procedure, in accordance with the present disclosure.

FIG. 3 is a diagram illustrating an example of a four-step random access procedure, in accordance with the present disclosure. As shown in FIG. 3, a base station 110 and a UE 120 may communicate with one another to perform the four-step random access procedure.

As shown by reference number 305, the base station 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in a radio resource control (RRC) message and/or a physical downlink control channel (PDCCH) order message that triggers a random access channel (RACH) procedure, such as for contention-free random access. The random access configuration information may include one or more parameters to be used in the random access procedure, such as one or more parameters for transmitting a random access message (RAM) and/or one or more parameters for receiving a random access response (RAR).

As shown by reference number 310, the UE 120 may transmit a RAM, which may include a preamble (sometimes referred to as a random access preamble, a PRACH preamble, or a RAM preamble). The message that includes the preamble may be referred to as a message 1, msg1, MSG1, a first message, or an initial message in a four-step random access procedure. The random access message may include a random access preamble identifier.

As shown by reference number 315, the base station 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step random access procedure, the base station 110 may transmit a PDCCH communication for the RAR. The PDCCH communication may schedule a physical downlink shared channel (PDSCH) communication that includes the RAR. For example, the PDCCH communication may indicate a resource allocation for the PDSCH communication. Also as part of the second step of the four-step random access procedure, the base station 110 may transmit the PDSCH communication for the RAR, as scheduled by the PDCCH communication. The RAR may be included in a medium access control (MAC) protocol data unit (PDU) of the PDSCH communication.

As shown by reference number 320, the UE 120 may transmit an RRC connection request message. The RRC connection request message may be referred to as message 3, msg3, MSG3, or a third message of a four-step random access procedure. In some aspects, the RRC connection request may include a UE identifier, uplink control information (UCI), and/or a physical uplink shared channel (PUSCH) communication (e.g., an RRC connection request).

As shown by reference number 325, the base station 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information. As shown by reference number 330, if the UE 120 successfully receives the RRC connection setup message, the UE 120 may transmit a hybrid automatic repeat request (HARD) acknowledgement (ACK).

As indicated above, FIG. 3 is provided as an example. Other examples may differ from what is described with regard to FIG. 3.

Figure 4A:
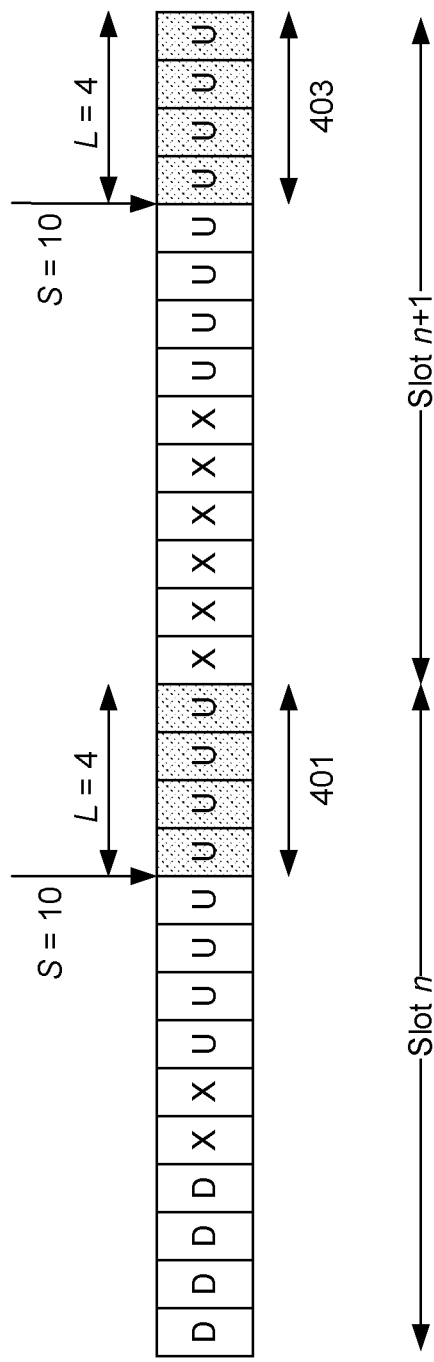
FIGS. 4A and 4B are diagrams illustrating examples of repetition types for UEs, in accordance with the present disclosure.
Figure 4B:
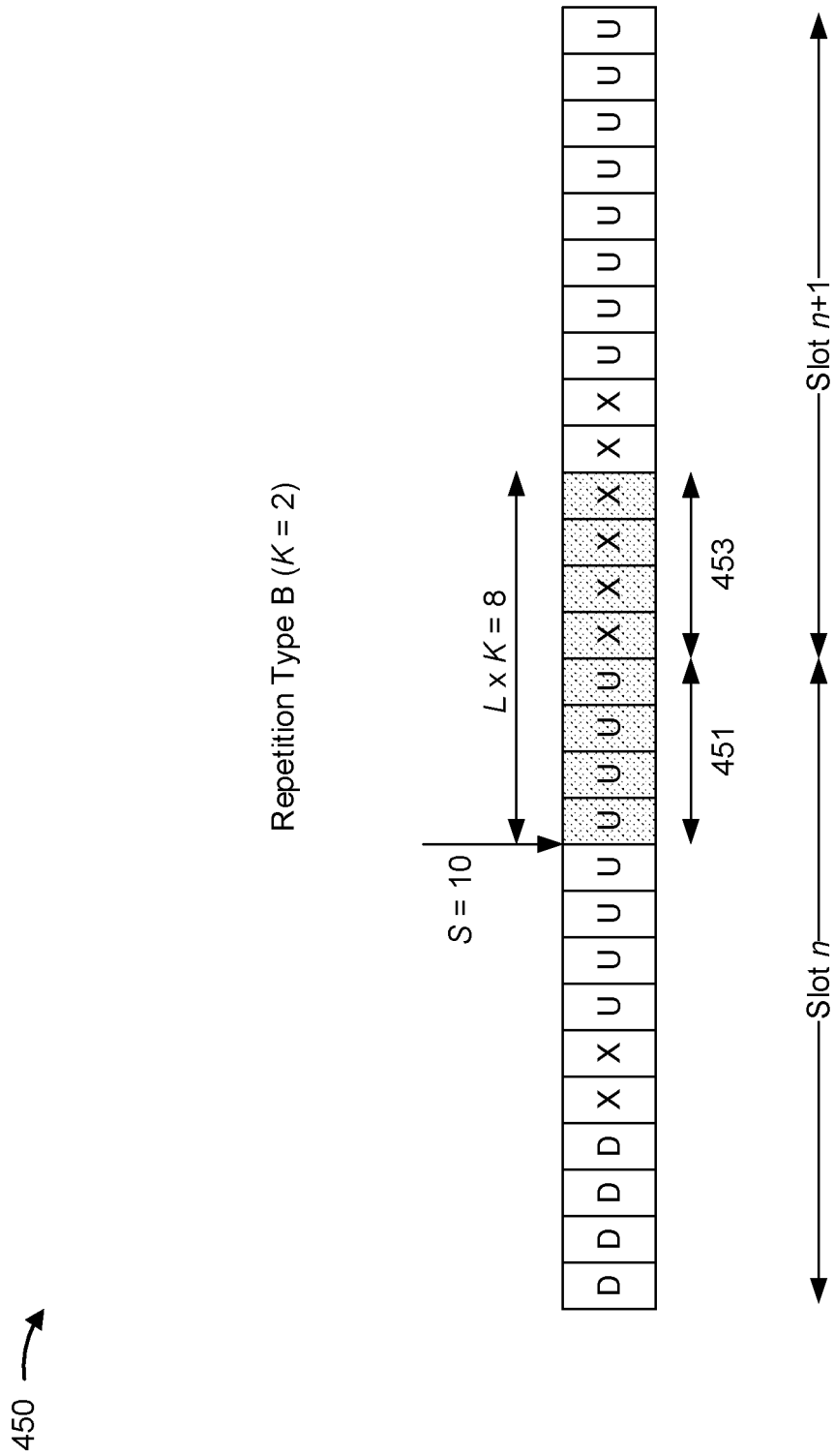

FIGS. 4A and 4B are diagrams illustrating an example 400 and an example 450, respectively, of repetition types for UEs, in accordance with the present disclosure. The repetitions shown in FIGS. 4A and 4B may be used for uplink communications from a UE (e.g., UE 120) to a base station (e.g., base station 110). Accordingly, the UE 120 may repeat an uplink communication across symbols in order to increase reliability of the communication to the base station 110. Example 400 depicts a repetition type A (e.g., used by the UE 120 for a PUSCH communication), and example 450 depicts a repetition type B (e.g., used by the UE 120 for a PUSCH communication). Other repetition types may include, for example, repetitions across symbols in non-consecutive slots and/or repetitions across symbols, in consecutive slots (e.g., as shown in FIG. 4A) or non-consecutive slots, that also cross slot boundaries (e.g., as shown in FIG. 4B).

As shown in FIG. 4A, a repetition type A may include a number of repetitions (represented by K in example 400) applied across consecutive slots. In example 400, K=2, but the description applies similarly to greater numbers of repetitions (e.g., three, four, five, and so on). The repetition type A may be further defined by a starting symbol (represented by S in example 400) and a length (represented by L in example 400). Accordingly, the repetition depicted in FIG. 4A is for a four-symbol transmission (L=4) that begins after the tenth symbol (S=10) in each slot (e.g., transmission 401 in an initial slot represented by n). The UE 120 may then repeat the four-symbol transmission in the tenth symbol of one or more additional slots (e.g., transmission 403 in a subsequent slot represented by n+1) until the UE 120 has repeated the transmissions for the number of repetitions K. In example 400, L=4, but the description applies similarly to shorter transmissions (e.g., one symbol, two symbols, and so on) or to longer transmissions (e.g., five symbols, six symbols, and so on). In example 400, S=10, but the description applies similarly to earlier symbols (e.g., the ninth symbol, the eighth symbol, and so on) or to later symbols (e.g., the eleventh symbol, the twelfth symbol, and so on). In some aspects, the repetition may be configured by an indication of the starting symbol and the length from the base station 110 (e.g., comprising two integers, comprising a single integer (also referred to as a start and length indicator value (SLIV)), and/or another similar indicator).

As shown in FIG. 4B, a repetition type B may include a number of repetitions (represented by K in example 450) applied across consecutive groups of symbols. In example 450, K=2, but the description applies similarly to greater numbers of repetitions (e.g., three, four, five, and so on). The repetition type B may be further defined by a starting symbol (represented by S in example 450) and a length (represented by L in example 450). Accordingly, the repetition depicted in FIG. 4B is for a four-symbol transmission (L=4) that begins after the tenth symbol (S=10) in a first slot (e.g., transmission 451 in a set of symbols in a slot represented by n). The UE 120 may then repeat the four-symbol transmission in each succeeding group of four symbols (e.g., transmission 453 in a subsequent set of symbols in a slot represented by n+1) until the UE 120 has repeated the transmissions for the number of repetitions K. In example 450, L=4, but the description applies similarly to shorter transmissions (e.g., one symbol, two symbols, and so on) or to longer transmissions (e.g., five symbols, six symbols, and so on). In example 450, S=10, but the description applies similarly to earlier symbols (e.g., the ninth symbol, the eighth symbol, and so on) or to later symbols (e.g., the eleventh symbol, the twelfth symbol, and so on). In some aspects, the repetition may be configured by an indication of the starting symbol and the length from the base station 110 (e.g., comprising two integers, comprising a single integer (e.g., a SLIV), and/or another similar indicator).

As indicated above, FIGS. 4A and 4B are provided as examples. Other examples may differ from what is described with respect to FIGS. 4A and 4B.

A UE and/or a base station may experience reduced signal power when using millimeter wave (mmW) and/or other higher radio frequencies (e.g., FR2 and/or other frequencies) as compared with FR1 frequencies, mid-band frequencies, and/or other lower radio frequencies. Accordingly, the UE may repeat uplink transmissions to the base station, when using such frequencies, in order to increase reliability. However, legacy UEs are not configured to perform uplink repetitions, particularly for random access procedures (e.g., as described in connection with FIG. 3). Accordingly, non-legacy UEs will be unable to use repetitions to increase reliability if the base station does not monitor for such repetitions. As an alternative, the base station will waste network and processing resources if the base station attempts to decode repetitions from a legacy UE.

Some techniques and apparatuses described herein enable a UE (e.g., UE 120) to implicitly indicate, to a base station (e.g., base station 110), one or more capabilities associated with the UE 120 (e.g., repetition capabilities) using a PRACH preamble. For example, the UE 120 may vary one or more properties associated with the PRACH preamble (e.g., one or more properties of the content and/or the transmission of the PRACH preamble) to indicate one or more capabilities to the base station 110. As a result, the UE 120 may use repetitions to increase reliability by ensuring that the base station 110 will monitor for those repetitions. Additionally, the base station 110 will not expend network and processing resources monitoring for repetitions unless the UE 120 indicates such a capability to the base station 110.

Figure 5:
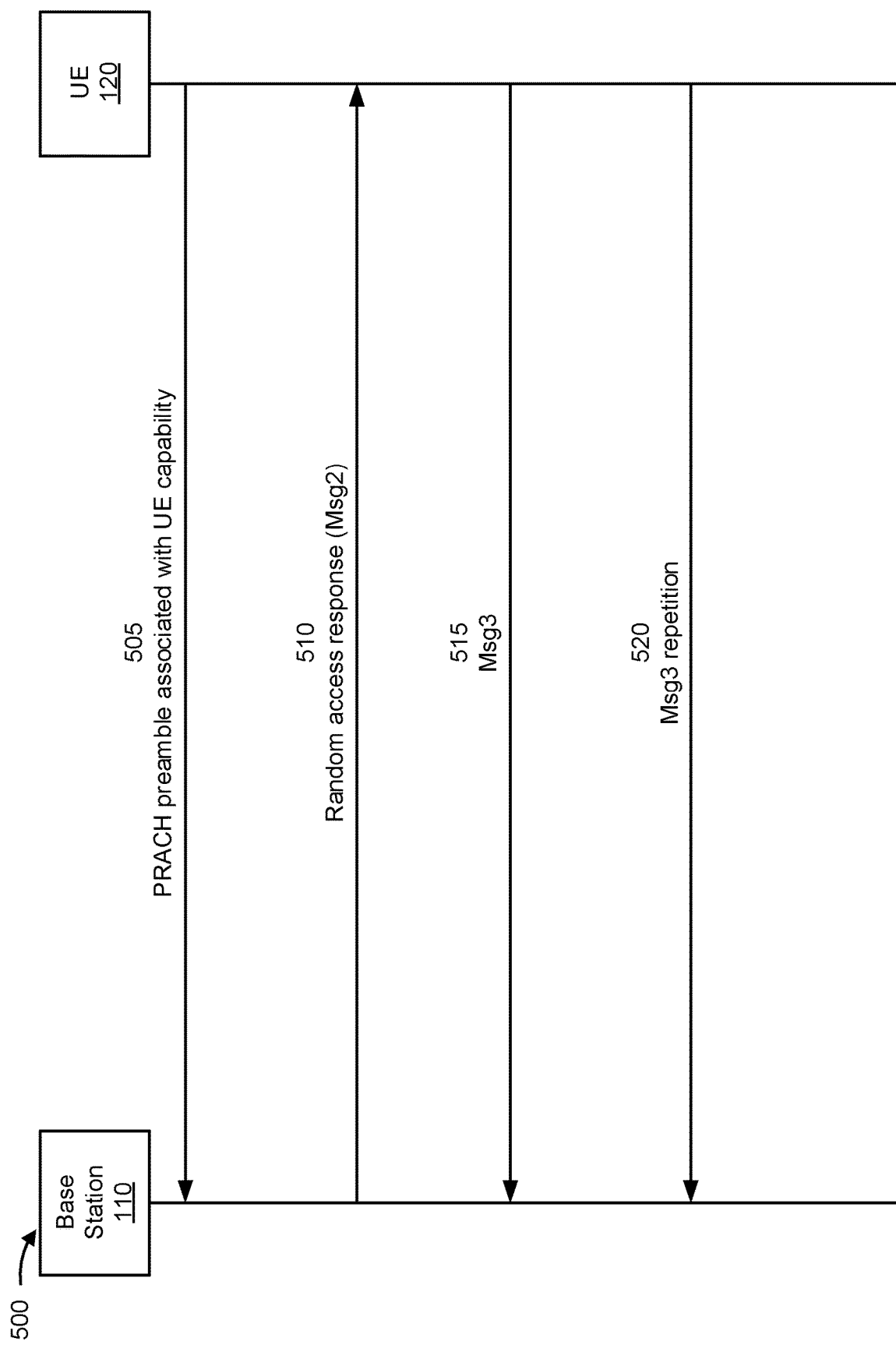
FIG. 5 is a diagram illustrating examples associated with indicating UE capability using random access preambles, in accordance with the present disclosure.

FIG. 5 is a diagram illustrating an example 500 associated with indicating UE capability using random access preambles, in accordance with the present disclosure. As shown in FIG. 5, example 500 includes communication between a base station 110 and a UE 120. In some aspects, the base station 110 and UE 120 may be included in a wireless network, such as wireless network 100.

As shown in connection with reference number 505, the UE 120 may transmit, and the base station 110 may receive, a random access preamble, where at least one property associated with the random access preamble corresponds to at least one capability, of the UE 120, associated with a connection request. In some aspects, the random access preamble comprises a PRACH preamble (e.g., as described in connection with FIG. 3). Accordingly, the UE 120 may perform the process described in connection with FIG. 5 in order to establish a RACH with the base station 110.

In some aspects, the at least one capability may include a repetition capability associated with the connection request. For example, the UE 120 may use the at least one property to indicate that the UE 120 has a capability to repeat the connection request (e.g., as described in connection with reference number 520). Accordingly, the UE 120 may use the at least one property to request repetition of Msg3 (that includes the connection request).

Additionally, or alternatively, the at least one capability may include a cross-slot channel estimation capability associated with the connection request. For example, the UE 120 may use the at least one property to indicate that the UE 120 has a capability to aggregate a DMRS across repetitions of Msg3 (that includes the connection request) in order to allow the base station 110 to perform cross-slot channel estimation.

Additionally, or alternatively, the at least one capability may include a repetition capability associated with a plurality of transmission configuration indicator (TCI) states for the connection request. For example, the UE 120 may use the at least one property to indicate that the UE 120 has a capability to repeat Msg3 (that includes the connection request) using a plurality of TCI states. Accordingly, the UE 120 may indicate that the UE 120 has a capability to repeat the connection request using a plurality of beams (e.g., of different directions), where the plurality of beams correspond to the plurality of TCI states.

Additionally, or alternatively, the at least one capability may include a repetition type associated with the connection request. For example, the UE 120 may use the at least one property to indicate that the UE 120 has a capability to repeat Msg3 (that includes the connection request) according to a repetition type A (e.g., as described in connection with FIG. 4A), according to a repetition type B (e.g., as described in connection with FIG. 4B), and/or according to another repetition type.

Accordingly, the UE 120 may vary the at least one property, as described below, in order to indicate that at least one capability, as described above. In some aspects, the at least one property associated with the random access preamble may include a repetition of the random access preamble over a plurality of random access occasions. For example, the UE 120 may repeat the random access preamble across the plurality of random access occasions in order to indicate that the UE 120 has a capability to repeat Msg3; a capability to aggregate a DMRS across repetitions of Msg3; a capability to repeat Msg3 using a plurality of TCIs; and/or a capability to repeat Msg3 according to a repetition type A (e.g., as described in connection with FIG. 4A), according to a repetition type B (e.g., as described in connection with FIG. 4B), and/or according to another repetition type. In some aspects, the UE 120 may repeat the random access preamble across a quantity of random access occasions in order to indicate different capabilities. For example, the UE 120 may repeat the random access preamble across two random access occasions in order to indicate that the UE 120 has a capability to repeat Msg3 according to a repetition type A (e.g., as described in connection with FIG. 4A), and may repeat the random access preamble across four random access occasions in order to indicate that the UE 120 has a capability to repeat Msg3 according to a repetition type B (e.g., as described in connection with FIG. 4B). In another example, the UE 120 may repeat the random access preamble across three random access occasions in order to indicate that the UE 120 has a capability to repeat Msg3, and may repeat the random access preamble across five random access occasions in order to indicate that the UE 120 has a capability to aggregate a DMRS across repetitions of Msg3 and/or to repeat Msg3 using a plurality of TCIs.

Additionally, or alternatively, the at least one property associated with the random access preamble may include a selection of one or more sequences used to generate the random access preamble. For example, the UE 120 may generate the random access preamble based at least in part on a Zaddoff-Chu sequence and a cyclic shift. Accordingly, the UE 120 may use a different Zaddoff-Chu sequence and/or a different cyclic shift such that random access preambles generated using that different sequence and/or different cyclic shift indicate at least one capability of the UE 120 (e.g., indicate a request to repeat Msg3). For example, the UE 120 may transmit random access preambles generated using a first sequence and/or cyclic shift in order to indicate that the UE 120 has a capability to repeat the connection request according to a repetition type A (e.g., as described in connection with FIG. 4A), and may transmit random access preambles generated using a second sequence and/or cyclic shift in order to indicate that the UE 120 has a capability to repeat the connection request according to a repetition type B (e.g., as described in connection with FIG. 4B). In another example, the UE 120 may transmit random access preambles generated using a first sequence and/or cyclic shift in order to indicate that the UE 120 has a capability to repeat the connection request, and the UE 120 may transmit random access preambles generated using a second sequence and/or cyclic shift in order to indicate that the UE 120 has a capability to aggregate a DMRS across repetitions of the connection request and/or to repeat the connection request using a plurality of TCIs.

Additionally, or alternatively, the at least one property associated with the random access preamble may include a selection of one or more random access occasions for transmitting the random access preamble. For example, the UE 120 may transmit the random access preamble in one or more random access occasions, of a plurality of random access occasions indicated by the base station 110. Accordingly, the UE 120 may use one or more different random access occasions such that random access preambles transmitted in those one or more different occasions indicate at least one capability of the UE 120 (e.g., indicate a request to repeat Msg3). For example, the UE 120 may transmit random access preambles in one or more first random access occasions in order to indicate that the UE 120 has a capability to repeat Msg3 according to a repetition type A (e.g., as described in connection with FIG. 4A), and may transmit random access preambles in one or more second random access occasions in order to indicate that the UE 120 has a capability to repeat Msg3 according to a repetition type B (e.g., as described in connection with FIG. 4B). In another example, the UE 120 may transmit random access preambles in one or more first random access occasions in order to indicate that the UE 120 has a capability to repeat Msg3, and may transmit random access preambles in one or more second random access occasions in order to indicate that the UE 120 has a capability to aggregate a DMRS across repetitions of Msg3 and/or to repeat Msg3 using a plurality of TCIs.

These properties may be combined by the UE 120. For example, the UE 120 may transmit random access preambles generated using a particular sequence and/or cyclic shift in order to indicate that the UE 120 has a capability to repeat Msg3, and may transmit such random access preambles in one or more particular random access occasions in order to indicate that the UE 120 has a capability to aggregate a DMRS across repetitions of Msg3 and/or to repeat Msg3 using a plurality of TCIs. In another example, the UE 120 may repeat the random access preamble in order to indicate that the UE 120 has a capability to repeat Msg3, and may repeat the random access preamble across a first plurality of random access occasions in order to indicate that the UE 120 has a capability to repeat Msg3 according to a repetition type A (e.g., as described in connection with FIG. 4A), but may repeat the random access preamble across a second plurality of random access occasions in order to indicate that the UE 120 has a capability to repeat Msg3 according to a repetition type B (e.g., as described in connection with FIG. 4B).

Accordingly, based on the at least one property, the base station 110 may determine whether to monitor for Msg3 repetitions from the UE 120. For example, the at least one property may correspond to a request for Msg3 repetition based on an association programmed (and/or otherwise preconfigured) into the base station 110 (e.g., according to 3GPP specification and/or another standard). As a result, the base station 110 enables Msg3 repetition for the UE 120 while conserving power and processing resources by not monitoring for Msg3 repetitions from legacy UEs (and non-legacy UEs not requesting Msg3 repetition).

As shown in connection with reference number 510, the base station 110 may transmit, and the UE 120 may receive, a random access response based at least in part on the random access preamble. In some aspects, the random access response may comprise downlink control information (DCI) that schedules a Msg2 (e.g., as described in connection with FIG. 3). Additionally, or alternatively, the random access response may comprise a Msg2 (e.g., as described in connection with FIG. 3) transmitted on a PDSCH.

As shown in connection with reference number 515, the UE 120 may transmit, and the base station 110 may receive, a Msg3 based at least in part on the random access preamble. In some aspects, Msg3 may include an RRC connection request. Additionally, or alternatively, the UE 120 may transmit the Msg3 (e.g., as described in connection with FIG. 3) on a PUSCH.

In some aspects, the UE 120 may transmit, and the base station 110 may receive, repetitions of the Msg3 across a plurality of resources. For example, as shown in connection with reference number 520, the UE 120 may transmit, and the base station 110 may receive, at least one repetition of the Msg3.

In some aspects, the UE 120 may transmit, and the base station 110 may receive, repetitions of the Msg3 across the plurality of resources, based at least in part on the random access preamble. For example, the UE 120 may transmit, and the base station 110 may receive, repetitions of the Msg3 across the plurality of resources, based at least in part on one or more rules stored in the UE 120 and/or the base station 110. The rules may be based at least in part on 3GPP specifications and/or another standard and may be programmed (and/or otherwise preconfigured) into the UE 120 and/or the base station 110. The rules may use a frequency domain resource allocation (FDRA), a time domain resource allocation (TDRA), and/or another resource indicator (e.g., used for a first transmission of the connection request) as input. The rules may further provide one or more additional FDRAs, TDRAs, and/or other resource indicators (e.g., used for one or more repetitions of the connection request) as output. Additionally, or alternatively, the UE 120 may have received, and the base station 110 may have transmitted (e.g., in the Msg2 described above), an indication of one or more parameters associated with the Msg3. For example, the one or more parameters may include an FDRA, a TDRA, and/or another resource indicator (e.g., used for a first transmission of the connection request). Accordingly, the UE 120 may transmit, and the base station 110 may receive, repetitions of the Msg3 across the plurality of resources, based at least in part on applying the one or more rules to the one or more parameters (e.g., to determine one or more additional FDRAs, TDRAs, and/or other resource indicators used for one or more repetitions of the Msg3).

As an alternative, the UE 120 may transmit, and the base station 110 may receive, repetitions of the Msg3 across the plurality of resources, based at least in part on an indication to repeat the Msg3. For example, the UE 120 may have received, and the base station 110 may have transmitted (e.g., in the Msg2 described above), the indication to repeat the Msg3. The indication may include a flag (e.g., a single bit marked '1' or TRUE) included in a DCI associated with a Msg2 (e.g., as described above), a field included in the Msg2, and/or another data structure. In some aspects, the UE 120 may transmit, and the base station 110 may receive, repetitions of the Msg3 across the plurality of resources, based at least in part on one or more rules stored in the UE 120 and/or the base station 110. The rules may be based at least in part on 3GPP specifications and/or another standard and may be programmed (and/or otherwise preconfigured) into the UE 120 and/or the base station 110. The rules may use an FDRA, a TDRA, and/or another resource indicator (e.g., used for a first transmission of the connection request) as input. The rules may further provide one or more additional FDRAs, TDRAs, and/or other resource indicators (e.g., used for one or more repetitions of the connection request) as output. Additionally, or alternatively, the indication may include one or more parameters associated with the Msg3, and the UE 120 may transmit, and the base station 110 may receive, repetitions of the connection request across the plurality of resources, based at least in part on the one or more parameters. For example, the one or more parameters may include a plurality of FDRAs, a plurality of TDRAs, and/or other resource indicators used for repetitions of the Msg3.

By using techniques as described in connection with FIG. 5, the UE 120 may implicitly indicate, to the base station 110, one or more capabilities associated with the UE 120 (e.g., a request to repeat Msg3) using a random access preamble. For example, as described above, the UE 120 may vary one or more properties associated with the random access preamble (e.g., one or more properties of the content and/or the transmission of the random access preamble) to indicate the one or more capabilities to the base station 110. Thus, the UE 120 may transmit repetitions of a Msg3 to increase reliability by ensuring that the base station 110 will monitor for those repetitions. Additionally, the base station 110 will conserve network and processing resources by not monitoring for repetitions of Msg3 unless the UE 120 implicitly indicates the one or more capabilities.

As indicated above, FIG. 5 is provided as an example. Other examples may differ from what is described with respect to FIG. 5.

Figure 6:
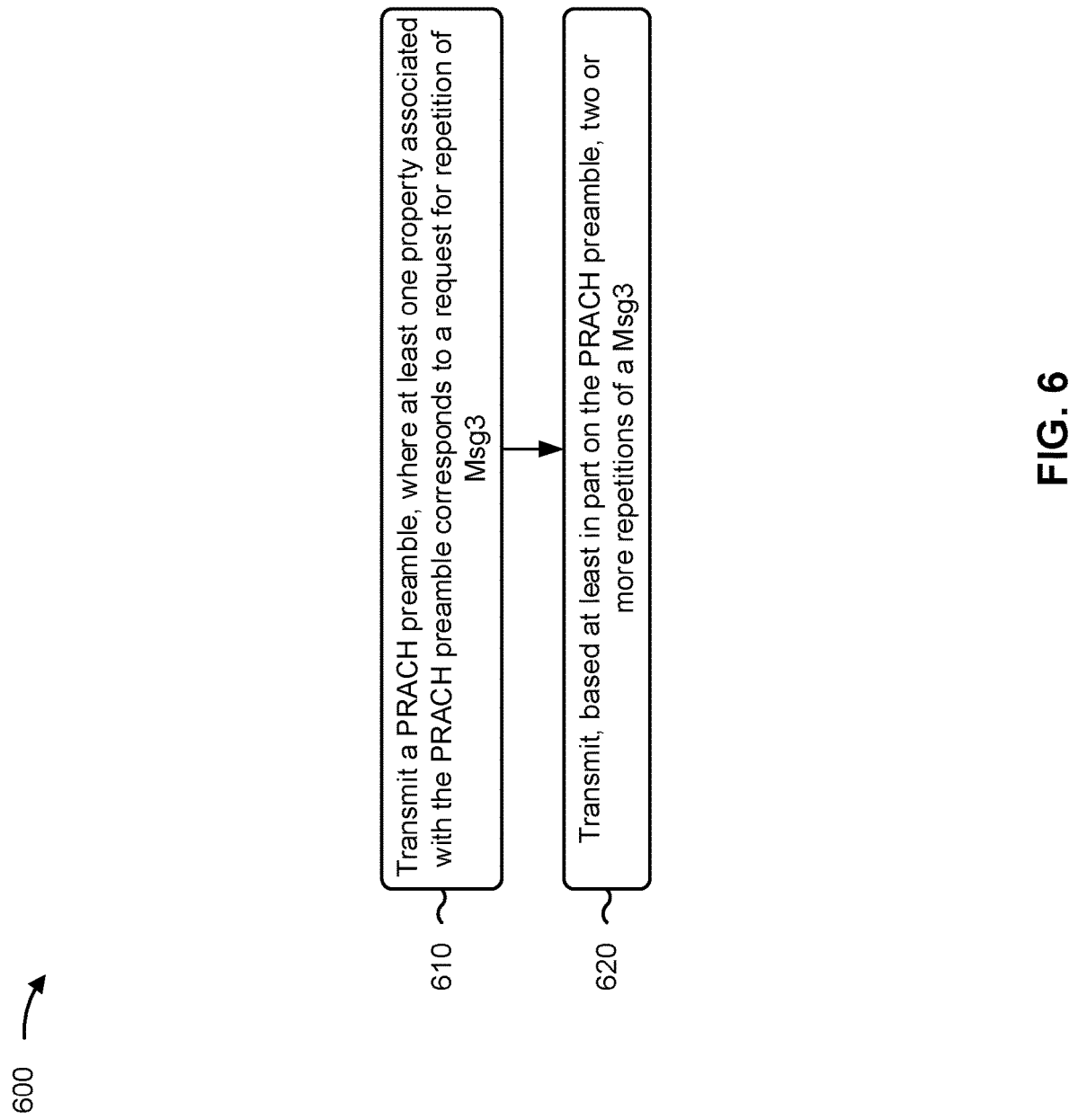
FIGS. 6 and 7 are diagrams illustrating example processes associated with indicating UE capability using random access preambles, in accordance with the present disclosure.

FIG. 6 is a diagram illustrating an example process 600 performed, for example, by a UE, in accordance with the present disclosure. Example process 600 is an example where the UE (e.g., UE 120 and/or apparatus 800 of FIG. 8) performs operations associated with indicating UE capability using random access preambles.

As shown in FIG. 6, in some aspects, process 600 may include transmitting, to a base station (e.g., base station 110 and/or apparatus 900 of FIG. 9), a PRACH preamble (block 610). For example, the UE (e.g., using transmission component 804, depicted in FIG. 8) may transmit, to a base station, a PRACH preamble, as described herein. In some aspects, at least one property associated with the PRACH preamble corresponds to a request for repetition of Msg3.

As further shown in FIG. 6, in some aspects, process 600 may include transmitting, to the base station and based at least in part on the PRACH preamble, two or more repetitions of a Msg3 (block 620). For example, the UE (e.g., using transmission component 804) may transmit, to the base station and based at least in part on the PRACH preamble, two or more repetitions of a Msg3, as described herein.

Process 600 may include additional aspects, such as any single aspect or any combination of aspects described below and/or in connection with one or more other processes described elsewhere herein.

In a first aspect, the Msg3 includes an RRC connection request. As a result, the UE 120 reduces latency in establishing an RRC connection with the base station 110.

In a second aspect, alone or in combination with the first aspect, the Msg3 is transmitted on a PUSCH.

In a third aspect, alone or in combination with one or more of the first and second aspects, the request further indicates a cross-slot channel estimation capability associated with the Msg3, a repetition capability associated with a plurality of transmission configuration indicators for the Msg3, a repetition type associated with the Msg3, or a combination thereof. As a result, the UE 120 is able to increase reliability of Msg3 by using cross-slot channel estimation, using repetition over a plurality of TCI states, and/or selecting between repetition type A or repetition type B for Msg3.

In a fourth aspect, alone or in combination with one or more of the first through third aspects, the at least one property associated with the PRACH preamble includes a selection of one or more sequences used to generate the PRACH preamble, a selection of one or more PRACH occasions for transmitting the PRACH preamble, or a combination thereof. As a result, the base station 110 is able to determine whether to monitor for Msg3 repetitions based on the at least one property.

In a fifth aspect, alone or in combination with one or more of the first through fourth aspects, transmitting the two or more repetitions of the Msg3 includes transmitting the two or more repetitions across a plurality of resources. As a result, the base station 110 is able to decode Msg3 using soft combining.

In a sixth aspect, alone or in combination with one or more of the first through fifth aspects, transmitting the two or more repetitions across the plurality of resources is based at least in part on one or more rules stored in the UE.

In a seventh aspect, alone or in combination with one or more of the first through sixth aspects, process 600 further includes receiving (e.g., using reception component 802, depicted in FIG. 8), from the base station, an indication of a quantity of repetitions associated with the Msg3. As a result, the base station 110 conserves power and processing resources by only monitoring for the indicated quantity of repetitions of Msg3.

In an eighth aspect, alone or in combination with one or more of the first through seventh aspects, process 600 further includes receiving (e.g., using reception component 802), from the base station, an indication to repeat the Msg3, such that the two or more repetitions of the Msg3 are transmitted based at least in part on the indication. As a result, the UE 120 conserves power and processing resources by only transmitting repetitions of Msg3 when the base station 110 indicates that the base station 110 will monitor for the repetitions.

In a ninth aspect, alone or in combination with one or more of the first through eighth aspects, the indication is included in a Msg2 received on a PDSCH.

In a tenth aspect, alone or in combination with one or more of the first through ninth aspects, the two or more repetitions of the Msg3 are transmitted based at least in part on one or more rules stored in the UE.

In an eleventh aspect, alone or in combination with one or more of the first through tenth aspects, process 600 further includes receiving (e.g., using reception component 802), from the base station, one or more parameters associated with the Msg3, such that the two or more repetitions of the Msg3 are transmitted based at least in part on the one or more parameters. As a result, the UE 120 experiences increased quality and reliability or reduced latency when transmitting the repetitions of the Msg3, depending on the one or more parameters.

In a twelfth aspect, alone or in combination with one or more of the first through eleventh aspects, the indication is included in at least one of a Msg2 received on a PDSCH or DCI received on a PDCCH.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
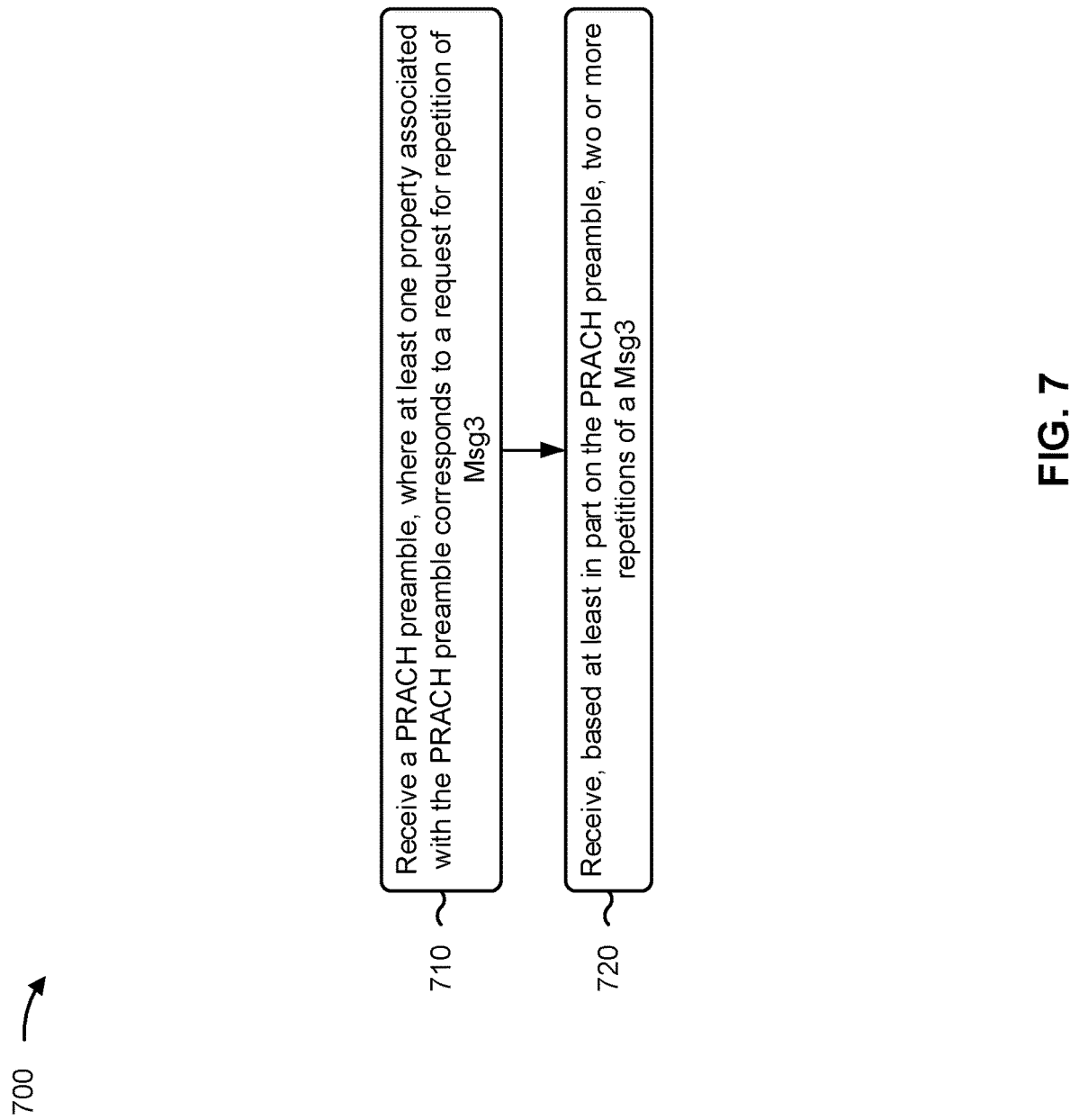

FIG. 7 is a diagram illustrating an example process 700 performed, for example, by a base station, in accordance with the present disclosure. Example process 700 is an example where the base station (e.g., base station 110 and/or apparatus 900 of FIG. 9) performs operations associated with indicating UE capability using random access preambles.

As shown in FIG. 7, in some aspects, process 700 may include receiving, from a UE (e.g., UE 120 and/or apparatus 800 of FIG. 8), a PRACH preamble (block 710). For example, the base station (e.g., using reception component 902, depicted in FIG. 9) may receive, from a UE, a PRACH preamble, as described herein. In some aspects, at least one property associated with the PRACH preamble corresponds to a request for Msg3 repetition.

As further shown in FIG. 7, in some aspects, process 700 may include receiving, from the UE and based at least in part on the PRACH preamble, two or more repetitions of a Msg3 (block 720). For example, the base station (e.g., using reception component 902) may receive, from the UE and based at least in part on the PRACH preamble, two or more repetitions of a Msg3, as described herein.

Process 700 may include additional aspects, such as any single aspect or any combination of aspects described below and/or in connection with one or more other processes described elsewhere herein.

In a first aspect, the Msg3 includes an RRC connection request. As a result, the base station 110 experiences reduced latency in establishing an RRC connection with the UE 120.

In a second aspect, alone or in combination with the first aspect, the Msg3 is received on a PUSCH.

In a third aspect, alone or in combination with one or more of the first and second aspects, the request further indicates a cross-slot channel estimation capability associated with the Msg3, a repetition capability associated with a plurality of transmission configuration indicators for the Msg3, a repetition type associated with the Msg3, or a combination thereof. As a result, the UE 120 is able to increase reliability of Msg3 by using cross-slot channel estimation, using repetition over a plurality of TCI states, and/or selecting between repetition type A or repetition type B for Msg3.

In a fourth aspect, alone or in combination with one or more of the first through third aspects, the at least one property associated with the PRACH preamble includes a selection of one or more sequences that the PRACH preamble is based on, a selection of one or more PRACH occasions that the PRACH preamble is received on, or a combination thereof. As a result, the base station 110 is able to determine whether to monitor for Msg3 repetitions based on the at least one property.

In a fifth aspect, alone or in combination with one or more of the first through fourth aspects, receiving the two or more repetitions of the Msg3 includes receiving the two or more repetitions across a plurality of resources. As a result, the base station 110 is able to decode Msg3 using soft combining.

In a sixth aspect, alone or in combination with one or more of the first through fifth aspects, receiving the two or more repetitions across the plurality of resources is based at least in part on one or more rules stored in the UE.

In a seventh aspect, alone or in combination with one or more of the first through sixth aspects, process 700 further includes transmitting (e.g., using transmission component 904, depicted in FIG. 9), to the UE, an indication of a quantity of repetitions associated with the Msg3. As a result, the base station 110 conserves power and processing resources by only monitoring for the indicated quantity of repetitions of Msg3.

In an eighth aspect, alone or in combination with one or more of the first through seventh aspects, process 700 further includes transmitting (e.g., using transmission component 904), to the UE, an indication to repeat the Msg3, such that the two or more repetitions of the Msg3 are received based at least in part on the indication. As a result, the UE 120 conserves power and processing resources by only transmitting repetitions of Msg3 when the base station 110 indicates that the base station 110 will monitor for the repetitions.

In a ninth aspect, alone or in combination with one or more of the first through eighth aspects, the indication is included in a Msg2 transmitted on a PDSCH.

In a tenth aspect, alone or in combination with one or more of the first through ninth aspects, the two or more repetitions of the Msg3 are received based at least in part on one or more rules stored in the base station.

In an eleventh aspect, alone or in combination with one or more of the first through tenth aspects, process 700 further includes transmitting (e.g., using transmission component 904), to the UE, one or more parameters associated with the Msg3, such that the two or more repetitions of the Msg3 are received based at least in part on the one or more parameters. As a result, the base station 110 is able to increase quality and reliability of the repetitions of the Msg3 or reduce latency associated with the repetitions of the Msg3, depending on the one or more parameters.

In a twelfth aspect, alone or in combination with one or more of the first through eleventh aspects, the indication is included in at least one of a Msg2 transmitted on a PDSCH or DCI transmitted on a PDCCH.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
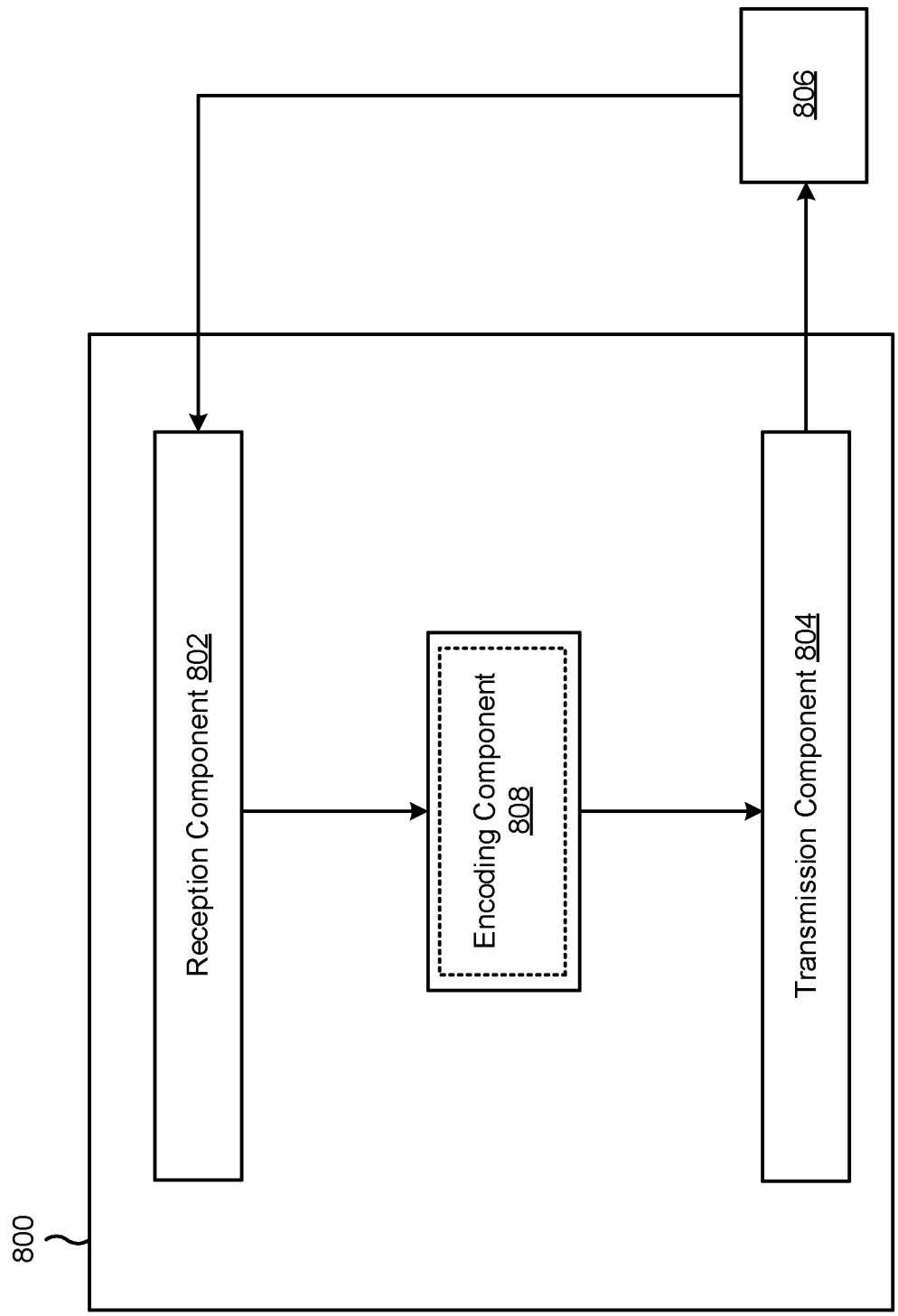
FIGS. 8 and 9 are diagrams of example apparatuses for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include an encoding component 808, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

In some aspects, transmission component 804 may transmit, to the apparatus 806, a PRACH preamble, and at least one property associated with the PRACH preamble may correspond to a request for Msg3 repetition from the apparatus 800. For example, the encoding component 808 may select one or more sequences to generate the PRACH preamble in order to indicate the request. In some aspects, the encoding component 808 may include a modulator, a transmit MIMO processor, a transmit processor, a controller/processor, a memory, or a combination thereof, of the UE described above in connection with FIG. 2. Additionally, or alternatively, the transmission component 804 may, in order to indicate the request, select one or more PRACH occasions for transmitting the PRACH preamble. Accordingly, the transmission component 804 may transmit, to the base station and based at least in part on the PRACH preamble, two or more repetitions of a Msg3.

In some aspects, the reception component 802 may receive, from the apparatus 806, an indication of one or more parameters associated with the Msg3. Accordingly, the transmission component 804 may transmit the two or more repetitions of the Msg3 based at least in part on the one or more parameters. Additionally, or alternatively, the reception component 802 may receive, from the apparatus 806, an indication to repeat the connection request. Accordingly, the transmission component 804 may transmit the two or more repetitions of the Msg3 based at least in part on the indication. For example, the reception component 802 may receive, from the apparatus 806, an indication a quantity of repetitions associated with the Msg3.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
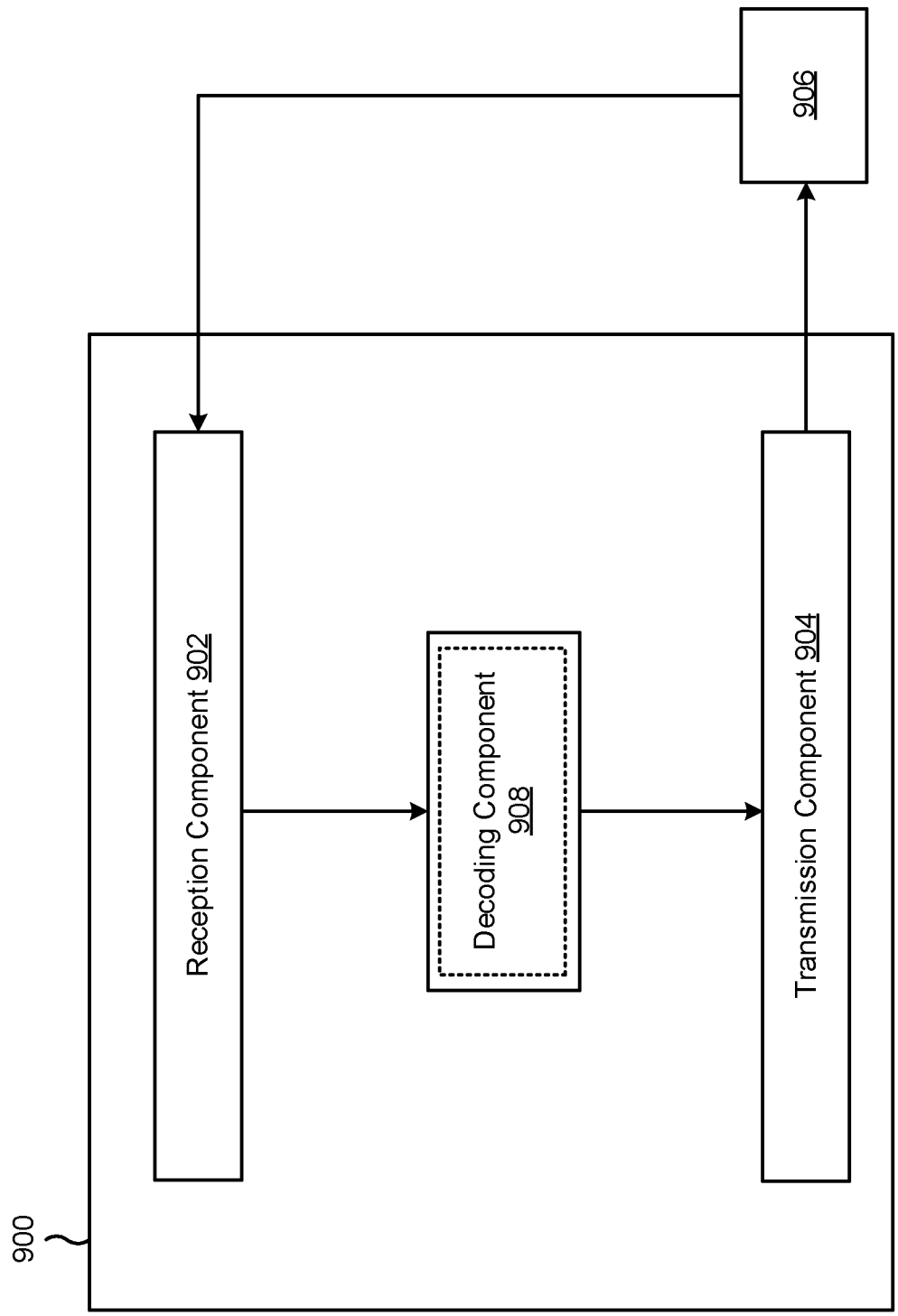

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a decoding component 908, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

In some aspects, the reception component 902 may receive, from the apparatus 906, a PRACH preamble, and at least one property associated with the PRACH preamble may correspond to a request for repetition of Msg3 from the apparatus 906. For example, the decoding component 908 may decode one or more sequences based at least in part on the PRACH preamble, and the decoded sequence(s) may indicate the request. In some aspects, the decoding component 908 may include a demodulator, a MIMO detector, a receive processor, a controller/processor, a memory, or a combination thereof, of the base station described above in connection with FIG. 2. Additionally, or alternatively, the reception component 902 may receive the PRACH preamble in one or more PRACH occasions, and the one or more PRACH occasions may indicate the request. Accordingly, the reception component 902 may receive, from the apparatus 906 and based at least in part on the random access preamble, two or more repetitions of the Msg3.

In some aspects, the transmission component 904 may transmit, to the apparatus 906, an indication of one or more parameters associated with the Msg3. Accordingly, the reception component 902 may receive the two or more repetitions of the Msg3 based at least in part on the one or more parameters. Additionally, or alternatively, the transmission component 904 may transmit, to the apparatus 906, an indication to repeat the Msg3. Accordingly, the reception component 902 may receive the two or more repetitions of the Msg3 based at least in part on the indication. For example, the transmission component 904 may transmit, to the apparatus 906, an indication a quantity of repetitions associated with the Msg3.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: transmitting, to a base station, a physical random access channel (PRACH) preamble, wherein at least one property associated with the PRACH preamble corresponds to a request for Msg3 repetition; and transmitting, to the base station and based at least in part on the random access preamble, two or more repetitions of a Msg3.

Aspect 2: The method of Aspect 1, the Msg3 includes a radio resource control (RRC) connection request.

Aspect 3: The method of any of Aspects 1 through 2, wherein the Msg3 is transmitted on a physical uplink shared channel (PUSCH).

Aspect 4: The method of any of Aspects 1 through 3, wherein the request further indicates: a cross-slot channel estimation capability associated with the Msg3, a repetition capability associated with a plurality of transmission configuration indicators for the Msg3, a repetition type associated with the Msg3, or a combination thereof.

Aspect 5: The method of any of Aspects 1 through 4, wherein the at least one property associated with the PRACH preamble includes: a selection of one or more sequences used to generate the PRACH preamble, a selection of one or more PRACH occasions for transmitting the PRACH preamble, or a combination thereof.

Aspect 6: The method of any of Aspects 1 through 5, wherein transmitting the two or more repetitions of the Msg3 comprises transmitting the two or more repetitions across a plurality of resources.

Aspect 7: The method of Aspect 6, wherein transmitting the two or more repetitions across the plurality of resources is based at least in part on one or more rules stored in the UE.

Aspect 8: The method of any of Aspects 1 through 7, further comprising: receiving, from the base station, an indication of a quantity of repetitions associated with the Msg3.

Aspect 9: The method of Aspect 8, wherein the indication is included in a Msg2 received on a physical downlink shared channel (PDSCH).

Aspect 10: The method of any of Aspects 1 through 9, further comprising: receiving, from the base station, an indication to repeat the Msg3, wherein the two or more repetitions of the Msg3 are transmitted based at least in part on the indication.

Aspect 11: The method of Aspect 10, wherein the indication is included in a Msg2 received on a physical downlink shared channel (PDSCH).

Aspect 12: The method of any of Aspects 1 through 11, wherein the two or more repetitions of the Msg3 are transmitted based at least in part on one or more rules stored in the UE.

Aspect 13: The method of any of Aspects 1 through 12, further comprising: receiving, from the base station, an indication of one or more parameters associated with the Msg3, wherein the two or more repetitions of the Msg3 are transmitted based at least in part on the one or more parameters.

Aspect 14: The method of Aspect 13, wherein the indication is included in at least one of a Msg2 received on a physical downlink shared channel (PDSCH) or downlink control information (DCI) received on a physical downlink control channel (PDCCH).

Aspect 15: A method of wireless communication performed by a base station, comprising: receiving, from a user equipment (UE), a physical random access channel (PRACH) preamble, wherein at least one property associated with the PRACH preamble corresponds to a request for Msg3 repetition; and receiving, from the UE and based at least in part on the random access preamble, two or more repetitions of a Msg3.

Aspect 16: The method of Aspect 15, wherein the Msg3 includes a radio resource control (RRC) connection request.

Aspect 17: The method of any of Aspects 15 through 16, wherein the Msg3 is received on a physical uplink shared channel (PUSCH).

Aspect 18: The method of any of Aspects 15 through 17, wherein the request further indicates: a cross-slot channel estimation capability associated with the Msg3, a repetition capability associated with a plurality of transmission configuration indicators for the Msg3, a repetition type associated with the Msg3, or a combination thereof.

Aspect 19: The method of any of Aspects 15 through 18, wherein the at least one property associated with the PRACH preamble includes: a selection of one or more sequences that the PRACH preamble is based on, a selection of one or more PRACH occasions that the PRACH preamble is received on, or a combination thereof.

Aspect 20: The method of any of Aspects 15 through 19, wherein receiving the two or more repetitions of the Msg3 comprises receiving the two or more repetitions across a plurality of resources.

Aspect 21: The method of Aspect 20, wherein receiving the two or more repetitions across the plurality of resources is based at least in part on one or more rules stored in the base station.

Aspect 22: The method of any of Aspects 15 through 21, further comprising: transmitting, to the UE, an indication of a quantity of repetitions associated with the Msg3.

Aspect 23: The method of Aspect 22, wherein the indication is included in a Msg2 transmitted on a physical downlink shared channel (PDSCH).

Aspect 24: The method of any of Aspects 15 through 23, further comprising: transmitting, to the UE, an indication to repeat the Msg3, wherein the two or more repetitions of the Msg3 are received based at least in part on the indication.

Aspect 25: The method of Aspect 24, wherein the indication is included in a Msg2 transmitted on a physical downlink shared channel (PDSCH).

Aspect 26: The method of any of Aspects 15 through 25, wherein the two or more repetitions of the Msg3 are received based at least in part on one or more rules stored in the base station.

Aspect 27: The method of any of Aspects 15 through 26, further comprising: transmitting, to the UE, an indication of one or more parameters associated with the Msg3, wherein the two or more repetitions of the Msg3 are received based at least in part on the one or more parameters.

Aspect 28: The method of Aspect 27, wherein the indication is included in at least one of a Msg2 transmitted on a physical downlink shared channel (PDSCH) or downlink control information (DCI) transmitted on a physical downlink control channel (PDCCH).

Aspect 29: An apparatus for wireless communication at a device, comprising a processor; memory coupled with the processor; and instructions stored in the memory and executable by the processor to cause the apparatus to perform the method of one or more of Aspects 1-14.

Aspect 30: A device for wireless communication, comprising a memory and one or more processors coupled to the memory, the one or more processors configured to perform the method of one or more of Aspects 1-14.

Aspect 31: An apparatus for wireless communication, comprising at least one means for performing the method of one or more of Aspects 1-14.

Aspect 32: A non-transitory computer-readable medium storing code for wireless communication, the code comprising instructions executable by a processor to perform the method of one or more of Aspects 1-14.

Aspect 33: A non-transitory computer-readable medium storing a set of instructions for wireless communication, the set of instructions comprising one or more instructions that, when executed by one or more processors of a device, cause the device to perform the method of one or more of Aspects 1-14.

Aspect 34: An apparatus for wireless communication at a device, comprising a processor; memory coupled with the processor; and instructions stored in the memory and executable by the processor to cause the apparatus to perform the method of one or more of Aspects 15-28.

Aspect 35: A device for wireless communication, comprising a memory and one or more processors coupled to the memory, the one or more processors configured to perform the method of one or more of Aspects 15-28.

Aspect 36: An apparatus for wireless communication, comprising at least one means for performing the method of one or more of Aspects 15-28.

Aspect 37: A non-transitory computer-readable medium storing code for wireless communication, the code comprising instructions executable by a processor to perform the method of one or more of Aspects 15-28.

Aspect 38: A non-transitory computer-readable medium storing a set of instructions for wireless communication, the set of instructions comprising one or more instructions that, when executed by one or more processors of a device, cause the device to perform the method of one or more of Aspects 15-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
    a memory; and
    one or more processors, coupled to the memory, configured to:
        transmit, to a base station, a physical random access channel (PRACH) preamble, wherein at least one property associated with the PRACH preamble corresponds to a request for Msg3 repetition, wherein the request indicates a cross-slot channel estimation capability associated with the Msg3; and
        transmit, to the base station and based at least in part on the PRACH preamble, two or more repetitions of a Msg3.

2. The apparatus of claim 1, wherein the Msg3 includes a radio resource control (RRC) connection request.

3. The apparatus of claim 1, wherein the Msg3 is transmitted on a physical uplink shared channel (PUSCH).

4. The apparatus of claim 1, wherein the request further indicates:
    a repetition capability associated with a plurality of transmission configuration indicators for the Msg3,
    a repetition type associated with the Msg3, or
    a combination thereof.

5. The apparatus of claim 1, wherein the at least one property associated with the PRACH preamble includes:
    a selection of one or more sequences used to generate the PRACH preamble,
    a selection of one or more PRACH occasions for transmitting the PRACH preamble, or
    a combination thereof.

6. The apparatus of claim 1, wherein transmitting the two or more repetitions of the Msg3 comprises transmitting the two or more repetitions across a plurality of resources.

7. The apparatus of claim 6, wherein transmitting the two or more repetitions across the plurality of resources is based at least in part on one or more rules stored in the UE.

8. The apparatus of claim 1, wherein the one or more processors are further configured to:
    receive, from the base station, an indication of a quantity of repetitions associated with the Msg3.

9. The apparatus of claim 8, wherein the indication is included in a Msg2 received on a physical downlink shared channel (PDSCH).

10. The apparatus of claim 1, wherein the one or more processors are further configured to:
    receive, from the base station, an indication to repeat the Msg3,
    wherein the two or more repetitions of the Msg3 are transmitted based at least in part on the indication.

11. The apparatus of claim 10, wherein the indication is included in a Msg2 received on a physical downlink shared channel (PDSCH).

12. The apparatus of claim 1, wherein the two or more repetitions of the Msg3 are transmitted based at least in part on one or more rules stored in the UE.

13. The apparatus of claim 1, wherein the one or more processors are further configured to:
    receive, from the base station, an indication of one or more parameters associated with the Msg3,
    wherein the two or more repetitions of the Msg3 are transmitted based at least in part on the one or more parameters.

14. The apparatus of claim 13, wherein the indication is included in at least one of a Msg2 received on a physical downlink shared channel (PDSCH) or downlink control information (DCI) received on a physical downlink control channel (PDCCH).

15. An apparatus for wireless communication at a base station, comprising:
    a memory; and
    one or more processors, coupled to the memory, configured to:
        receive, from a user equipment (UE), a physical random access channel (PRACH) preamble, wherein at least one property associated with the PRACH preamble corresponds to a request for Msg3 repetition, wherein the request indicates a cross-slot channel estimation capability associated with the Msg3; and receive, from the UE and based at least in part on the PRACH preamble, two or more repetitions of a Msg3.

16. The apparatus of claim 15, wherein the Msg3 includes a radio resource control (RRC) connection request.

17. The apparatus of claim 15, wherein the Msg3 is received on a physical uplink shared channel (PUSCH).

18. The apparatus of claim 15, wherein the request further indicates:
  a repetition capability associated with a plurality of transmission configuration indicators for the Msg3,
  a repetition type associated with the Msg3, or
  a combination thereof.

19. The apparatus of claim 15, wherein the at least one property associated with the PRACH preamble includes:
  a selection of one or more sequences that the PRACH preamble is based on,
  a selection of one or more PRACH occasions that the PRACH preamble is received on, or
  a combination thereof.

20. The apparatus of claim 15, wherein receiving the two or more repetitions of the Msg3 comprises receiving the two or more repetitions across a plurality of resources.

21. The apparatus of claim 20, wherein receiving the two or more repetitions across the plurality of resources is based at least in part on one or more rules stored in the base station.

22. The apparatus of claim 15, wherein the one or more processors are further configured to:
  transmit, to the UE, an indication of a quantity of repetitions associated with the Msg3.

23. The apparatus of claim 22, wherein the indication is included in a Msg2 transmitted on a physical downlink shared channel (PDSCH).

24. The apparatus of claim 15, wherein the one or more processors are further configured to:
  transmit, to the UE, an indication to repeat the Msg3,
  wherein the two or more repetitions of the Msg3 are received based at least in part on the indication.

25. The apparatus of claim 24, wherein the indication is included in a Msg2 transmitted on a physical downlink shared channel (PDSCH).

26. The apparatus of claim 1, wherein the two or more repetitions of the Msg3 are received based at least in part on one or more rules stored in the base station.

27. The apparatus of claim 15, wherein the one or more processors are further configured to:
  transmit, to the UE, an indication of one or more parameters associated with the Msg3,
  wherein the two or more repetitions of the Msg3 are received based at least in part on the one or more parameters.

28. The apparatus of claim 27, wherein the indication is included in at least one of a Msg2 transmitted on a physical downlink shared channel (PDSCH) or downlink control information (DCI) transmitted on a physical downlink control channel (PDCCH).

29. A method of wireless communication performed by a user equipment (UE), comprising:
  transmitting, to a base station, a physical random access channel (PRACH) preamble, wherein at least one property associated with the PRACH preamble corresponds to a request for Msg3 repetition, wherein the request indicates a cross-slot channel estimation capability associated with the Msg3; and
  transmitting, to the base station and based at least in part on the PRACH preamble, two or more repetitions of a Msg3.

30. A method of wireless communication performed by a base station, comprising:
  receiving, from a user equipment (UE), a physical random access channel (PRACH) preamble, wherein at least one property associated with the PRACH preamble corresponds to a request for Msg3 repetition, wherein the request indicates a cross-slot channel estimation capability associated with the Msg3; and
  receiving, from the UE and based at least in part on the PRACH preamble, two or more repetitions of a Msg3.

* * * * *